United States Patent [19]

Ginsberg

[11] 3,748,541

[45] July 24, 1973

[54] ELECTRICAL SAFETY CONTROL CIRCUIT FOR PUNCH PRESSES AND THE LIKE

[76] Inventor: Leon Ginsberg, 19 Hafis Rd., Toronto, Ontario, Canada

[22] Filed: July 26, 1972

[21] Appl. No.: 275,317

[52] U.S. Cl. .............................. 317/135 R, 307/113
[51] Int. Cl. .......................................... H01h 47/04
[58] Field of Search ..................... 307/113; 317/135, 317/151, 139

[56] References Cited
UNITED STATES PATENTS 2,642,485  6/1953  Geiger et al. .................. 317/135 R
2,962,633  11/1960  Raymond ........................ 317/135 R
3,207,957  12/1965  Naylor ............................ 317/135 R
3,260,898  7/1966  Jones, Jr. ............................ 307/113

Primary Examiner—David Smith, Jr.
Attorney—J. A. Legris

[57] ABSTRACT

A safety control circuit for punch presses and the like has two push buttons which must be pressed almost simultaneously, each push button permitting discharge of a capacitor through a relay coil, each relay having a normally closed switch connecting the capacitor to a electrical supply and a normally open switch which, when closed, can bypass the normally closed switch of the other relay. The circuit can be arranged to fail safe.

5 Claims, 2 Drawing Figures

ELECTRICAL SAFETY CONTROL CIRCUIT FOR PUNCH PRESSES AND THE LIKE

BACKGROUND OF THE INVENTION

1. Field of the Invention

The invention relates to an electrical control circuit, and more particularly to a circuit for operating a machine, for example a punch press, wherein the operator must more or less simultaneously employ both his hands to close switches, thus keeping his hands away from the machine.

2. Description of the Prior Art

It is common to provide two hand-operated switches which must be closed to permit operation of a machine, but careless operators can defeat many systems now in use by permanently closing one of the switches by laying a weight upon it, or by short-circuiting it, or by other means. Such systems may also fail to provide protection through an unobservable failure to one of the components of the system.

SUMMARY OF THE INVENTION

According to the present invention there is provided a circuit which will not operate unless two manually-operable switches are pressed within a predetermined short time of each other, the time depending on the rate of discharge of a capacitor. The circuit can be enclosed, with only a pair of external wires for each of two manually operable switches. The circuit can be arranged to prevent operation if any part of the circuit fails, through for example the occurrence of a shorted or open condition, current leakage, a stuck switch or other malfunction, deliberate tampering with the circuit, and the like, and variations of supply voltages will not cause malfunction.

BRIEF DESCRIPTION OF THE DRAWINGS

Two embodiments of the invention are illustrated by way of example in the accompanying drawings in which.

DESCRIPTION OF THE PREFERRED EMBODIMENTS

Figure 1:
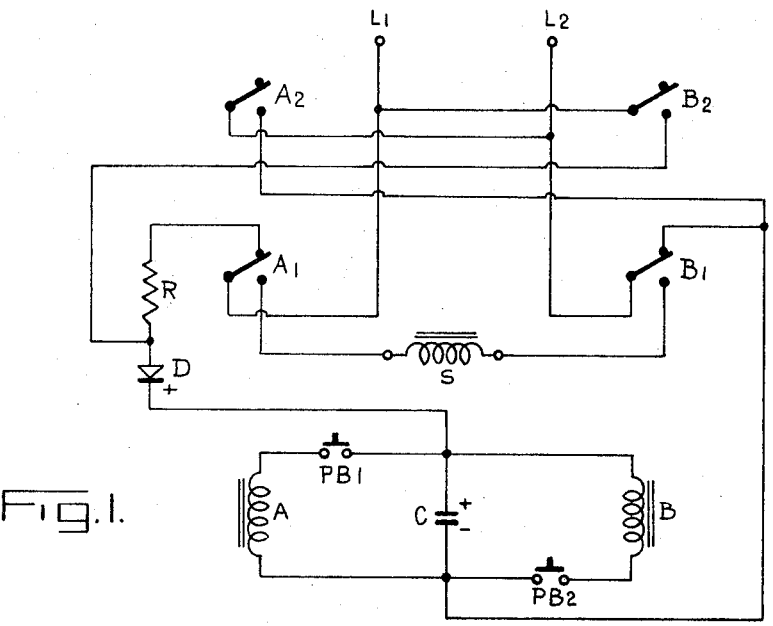
FIG. 1 shows a circuit that requires operation of two push buttons within a short time of each other.

The entire circuit of FIG. 1 can be housed within a sealed enclosure from which a pair of wires can run to an alternating current supply L1, L2, two pairs of wires can run to push button switches PB1, PB2, and a pair of wires can run to a solenoid S. Solenoid S when energized causes a punch press or the like to operate. The circuit includes two relays having coils A and B respectively, and the circuit is shown in the normal condition, connected to the supply L1, L2, with the coils A and B deenergized. Relay coil A can be energized to move relay switches A1, A2 from the normal or first positions in which they are shown to their alternate or second positions, and similarly relay coil B can be energized to move relay switches B1, B2 from their normal or first positions shown to their second positions.

In the normal condition shown, a capacitor C is charged from the supply L1, L2 through switches A1 and B2 which are in series with the capacitor and a resistor R and diode rectifier D. Extremely rapid charge of capacitor C is not required, and resistor R limits the current flow. Suppose that, with capacitor C charged, push button PB1 is closed. Capactior C begins to discharge through relay coil A, energizing that coil and causing switches A1 and A2 to move to their second positions. A1 thereby disconnects the capacitor C and relay A from L1, and connects L1 to one side of solenoid S. A2 connects L2 to the negative side of capacitor C, thus providing a bypass for switch B1. If nothing further is done, C soon becomes sufficiently discharged to cease holding relay A in, switches A1 and A2 return to the position illustrated, and solenoid S is disconnected from line L1 without having been connected at its other side to L2 and without, therefore, having been energized to operate the machine that it is intended to operate. If PB1 is still depressed, so that relay coil A remains in parallel with capacitor C across L1, L2, capacitor C does not become substantially recharged, and coil A is in series with resistor R and receives less current than it requires to pick up again, i.e., to move switches A1 and A2 from their normal positions illustrated. Thus, putting a weight on PB1, or short-circuiting it, will cause relay A to pick up for only a moment while capacitor C discharges through it, whereafter solenoid S is disconnected from L1. Even if relay A should pick up again, it would, in doing so, disconnect itself from L1, and thereby alternately pick up and drop out without maintaining a connection of L1 to S sufficient for the latter to operate. An operation similar to that which has been described will occur if only PB2 is depressed, the other side of solenoid S being only momentarily connected to L2.

If, however, push buttons PB1 and PB2 are depressed within a very short time of each other, relay coils A and B both receive from capacitor C sufficient discharge current to pick up. Switch B1 is bypassed by switch A2, and switch A1 and resistor R are bypassed by switch B2, ensuring that, after picking up, relays A and B remain connected across L1 and L2 with R bypassed, the current which the relay coils then receive being sufficient to hold them in the picked up condition. Solenoid S is connected across lines L1 and L2 through switches A1 and B1, and operates to control its machine as desired. Release of either push button causes the circuit to return to the normal condition, permitting capacitor C to recharge.

The circuit of FIG. 1 requires PB1 and PB2 to be closed within a very short time of each other if solenoid S is to be operated, the time preferably being about one quarter to one half a second, and being dependent on the rate of discharge of capacitor C through the relay coils. While the circuit of FIG. 1 is a substantial improvement over some circuits now in use, it is possible for it to fail to an unsafe condition. Suppose, for example, that switch A2 should become welded to its second or closed position. L2 would be permanently connected through A2 to the negative side of capacitor C. If push button switch PB2 were then closed, L2 would be connected through B2 to the positive side of capacitor C with R bypassed. If PB2 were permanently held down with a weight, relay coil B would remain picked up, and the operator could defeat the circuit, thereafter operating it at any time by merely pressing PB1. Similarly if B2 should become permanently closed the opeator could defeat the circuit by closing PB1 permanently and thereafter operating only PB2.

Figure 2:
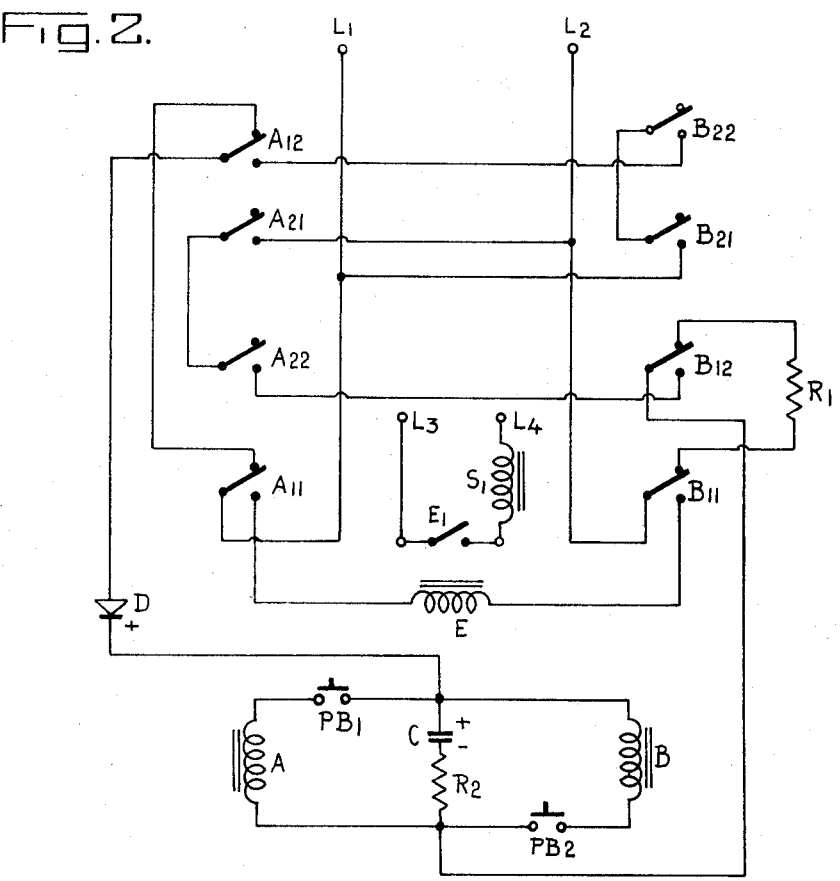
FIG. 2 shows a preferred circuit, which is a modification of the circuit of FIG. 1 to ensure fail safe operation.

The circuit of FIG. 2 overcomes possible difficulties of the foregoing kind. In FIG. 2 relay coil A operates four switches, two of which are a switch A11 in series with a switch A12, these switches normally connecting L1 through diode D to the positive side of capacitor C. Relay coil B operates four switches, two of which are B11 in series with B12 and normally connecting L2 through resistors R1 and R2 to the negative side of capacitor C. R1 serves the same purpose as resistor R in FIG. 1, and R2 is an optional surge resistor to further limit current flow to C when it is charging. If desired a leak resistor (not shown) can be provided across C to ensure that it does not stay charged for more than a couple of seconds when power is removed.

Relay coil A also operates the normally open switches A21 and A22 which are in series and can be closed to bypass the path through B11 and R1 to the negative side of the capacitor, switch B12 being, in its second position, part of this bypass.

Relay coil B operates the normally open switches B21 and B22 which are in series and can be closed to bypass the path through A11 to the positive side of the capacitor, A12 being, in its second position, part of this bypass. If the push buttons PB1 and PB2 are pressed substantially simultaneously with the circuit in the normal condition shown in FIG. 2, capacitor C discharges through relay coils A and B, causing switches A11 and B11 to be moved from their first, normally closed positions (where they form part of the charging connections for capacitor C), to their second positions where they cause relay E to be energized. While button PB1 and PB2 remain depressed, relays A and B are maintained picked up by current flowing in the path from L1 through B21, B22, A12, D, the paralled relays A and B, B12, A22, A21 to L2. But if the operator releases either push button, while holding the other depressed, he will break the connection to relay E as well as one of the bypasses, thereby cutting off power to C and to whatever relay is in parallel with it, so that both relays A and B drop out. It is to be noted that as soon as a push button switch opens the associated relay drops out independently of the state of charge of the capacitor C.

Relay E could be the solenoid that operates a punch press or the like, but in the arrangement of FIG. 2 a higher power circuit from supply L3 and L4 is provided, and relay E when energized closes switch E1 to energize punch press solenoid S1. Lines L1 and L2 may be from a low power twenty-four volt A.C. or D.C. supply, or from a 110 volt A.C. supply.

Fail safe characteristics of FIG. 2 are provided in part by the additional switches A12 and B12 in series with switches A11 and B11 respectively which are normally closed to connect L1 and L2 to the capacitor C, and by the additional switches A22 and B22 in series with the bypass switches A21 and B21 respectively. If any one of these switches should weld closed, there is another switch in series with it to prevent the circuit from failing to a hazardous condition. The following is a detailed analysis of what happens in the event of possible failures.

1. Switch A12 welds closed in its first (normally closed) position illustrated:

The switch A11 will take over the function of disconnecting the positive end of the capacitor from the supply line L1, when relay A is energized.

The fault will be recognized because the solenoid S1 cannot be maintained at its energized position, due to interruption at A12 in the bypass path L1–B21–B2-2–A12–D.

2. Switch A12 welds closed in its second position:

The capacitor C will remain discharged and the actuating of PB1 and PB2 will have no effect on either relay.

3. Switch A21 welds to its closed first (normally open) position illustrated:

The solenoid S1 will be energized briefly with the two push buttons depressed but there will be no power to maintain it in the closed position because the connection to L2 is interrupted at A21.

4. Switch A21 welds closed in its second (closed) position:

The switch A22, being in series with A21, will maintain normal operation.

5. A22 switch welds to its first (normally open) position:

The solenoid S1 will be energized briefly when the two push buttons are depressed: see condition (3) above.

6. Switch A22 welds closed in its second (closed) position:

The switch A21 will maintain normal operation: see condition (4) above.

7. Switch A11 welds closed in its first (normally closed) position:

The supply line to coil E being interrupted the solenoid S1 will never close.

8. Switch A11 welds closed in its second position:

The charging connection at the positive end of the capacitor will be interrupted at switch A11. The relays will not operate with the capacitor discharged.

9. Because of the symmetry of the circuit of FIG. 2, the switches of relay B will fail safe in ways similar to those described for the switches of relay A.

10. A too low supply voltage, an open or shorted relay coil, or a mechanically broken relay, locked in its dropped out or picked up condition, will make the unit inoperative because the capacitor fails to maintain its charge or the circuit required for the normal operation of the solenoid cannot be completed.

11. If either of the push buttons PB1 or PB2 fails to close its relay coil cannot be energized, and if either is permanently closed the capacitor cannot charge.

12. An open or shorted capacitor will make the relays inoperable. A leaking capacitor could result in unreliable or intermittent, but still safe, two hand operation.

13. The same applies to the rectifier diode; a leaking diode will result in insufficient D.C. voltage to operate the relay coils.

14. Unsafe, one hand operation cannot be triggered by an excessively high supply voltage, or by a shorted or open resistor or by any broken connection.

It will be seen that in the circuit of FIG. 2 fail safe operation is independent of relay maladjustment (spacing or spring tension) or deterioration and is independent of changes in supply voltage.

Whereas relays A and B are D.C. operated relays, the relay E may be an A.C. relay of a different type, for example a reliable industrial contactor. The normally open relay switch E1 could be of a type built to switch a highly inductive load. If desired, another normally open switch (not shown) can be put in series with E1 and closable by relay coil E when E1 is closed so that if one switch of relay E should by misadventure become permanently closed the proper operation of the other will prevent permanent connection of solenoid S1 to its supply L3, L4.

Modifications of the specific circuits illustrated will suggest themselves to those skilled in the art and are intended to be covered by the following claims.

What I claim as my invention is:

1. An electrical control circuit comprising a capacitor, a first and a second relay each having normally closed switches in series with the capacitor for charging the capacitor from a supply, each relay having a coil connectable across the capacitor by a closable switch for energization of the coil by discharge of the capacitor therethrough, each coil when so energized opening its said normally closed switch, to disconnect the capacitor from the supply, but closing a normally open switch which provides a bypass for the normally closed switch of the other relay whereby if both relays are so energized the capacitor is reconnected to the supply, the relays thereby remaining energized as long as said closable switches remain closed.

2. A control circuit as claimed in claim 1, including a resistor normally in series with the capacitor but bypassed, if both relays are so energized, to keep the relays energized.

3. A control circuit as claimed in claim 1, including a solenoid that is connectable to the supply by energization of both relays.

4. A contron circuit as claimed in claim 1, wherein each said normally closed switch is in series with another normally closed switch openable by energization of the same relay coil, and wherein each said normally open switch is in series with another normally open switch closable by energization of the said relay coil, whereby failure of one of the switches does not render the circuit unsafe.

5. A control circuit as claimed in claim 4, wherein said other normally closed switch when opened by energization of a relay coil moves to form part of the bypass provided by closing the normally open switches of the other relay.

* * * * *